Patented Jan. 10, 1950

2,494,064

UNITED STATES PATENT OFFICE 2,494,064

THERMAL HYDROGENOLYSIS OF FLUOROCARBONS TO PRODUCE FLUOROCARBON HYDRIDES

Joseph H. Simons, Wilbur H. Pearlson, and William R. James, State College, Pa., assignors to Minnesota Mining & Manufacturing Company, St. Paul, Minn., a corporation of Delaware No Drawing. Application March 31, 1947, Serial No. 738,506

4 Claims. (Cl. 260—653)

This invention relates to a novel method of making fluorocarbon hydrides. This method involves the vapor phase thermal hydrogenolysis of saturated polycarbon fluorocarbons, whereby carbon-carbon bond cleavage is produced and carbon-hydrogen bonds are formed. For example, $CF_2H_2$, $CF_3H$ and $C_2F_5H$ are obtained in this way by hydrogenolysis of $C_3F_8$. The fluorocarbon is heated in vapor phase in the presence of hydrogen at a temperature sufficiently high to cause hydrogenolysis.

An illustrative procedure consists essentially of heating a gaseous mixture of the fluorocarbon and hydrogen at a high temperature, as by passing through a tube heated by a furnace to a temperature of the order of 800–900° C. The fluorocarbon hydrides can be separated from the reaction mixture; or a mixture containing them can be further reacted to produce desired end products, as for example fluorocarbon chlorides and bromides, which can then be separated, as by fractional distillation.

This method depends upon our discovery that hydrogenolysis of the fluorocarbons can be produced at high temperatures which do not, however, cause significant loss of desired end products under the conditions prevailing. Apparently the hydrogen only causes cleavage of carbon-carbon bonds and not carbon-fluorine bonds. This is indicated by an experiment in which a mixture of $CF_4$ and a large excess of hydrogen was passed through a one inch diameter iron tube at about 1000° C. without any sign of reaction being observed, and there was no evidence of carbon deposition. Further evidence is supplied by the obtaining of $CF_2H_2$ as a product of the hydrogenolysis of $C_3F_8$. This could result from the cleavage of the two carbon-carbon bonds of the central carbon atom and the formation of two carbon-hydrogen bonds. It could also result from the formation of $C_2F_5H$, followed by cleavage of the carbon-carbon bond thereof. If any $C_3F_7H$ is formed, it must be in a negligible proportion.

Saturated polycarbon fluorocarbon monohydrides, monochlorides and monobromides, may be used as starting materials. For example, $C_3F_7H$, $C_3F_7Cl$ and $C_3F_7Br$, may be used as well as $C_3F_8$ and hydrogenolysis will occur. Alicyclic fluorocarbon compounds as well as open-chain fluorocarbon compounds may be used as starting materials and are included within the scope of the invention.

A feature of the present method is that it makes possible the production of saturated aliphatic fluorocarbon hydrides, including the monohydrides having the formula $C_nF_{2n+1}H$. These latter compounds are highly stable and are non inflammable, but have the feature of providing a hydrogen atom which offers a point of attack for chemical reaction. The boiling points are higher than those of the corresponding fluorocarbons, even though the molecular weights are lower. Thus $C_3F_7H$ has a higher boiling point than $C_3F_8$. These compounds have utility as refrigerants, solvents, dielectrics, fire extinguisher fluids, hydraulic mechanism fluids and heat exchange fluids, depending upon the boiling point, etc.

An important use for these fluorocarbon monohydrides is in making the corresponding fluorocarbon monochlorides ($C_nF_{2n+1}Cl$) and monobromides ($C_nF_{2n+1}Br$). These latter compounds are stable to light and heat and are inert to ordinary reagents, and have value for many of the uses of the straight fluorocarbons and fluorocarbon monohydrides. In addition they have utility in coupling and replacement reactions. The Grignard reagent can be formed. Thus $C_3F_7Br$ has been found to react with magnesium in the presence of ether when precautions were taken to remove traces of moisture.

The fluorocarbon hydrides can be thermally chlorinated and brominated by passing a gaseous mixture with chlorine or bromine through a tube which is heated in a furnace to a temperature of the order of 500–600° C. A "Pyrex" glass tube can be used. Yields of the order of 90% can be obtained. This method of chlorination and bromination is described and claimed in the application of Joseph H. Simons et al., Ser. No. 738,504, filed of even date herewith; and was also described in the Journal of the American Chemical Society, vol. 68, pp. 968–969 (June, 1946).

Example

A reaction apparatus was made of a tube of Monel metal 1 inch in diameter and 16 inches long placed in an iron pipe of slightly greater diameter. The annular space was sealed by wrapping the ends of the inner tube with several turns of 0.020 inch diameter silver wire to make a tight fit. The electric furnace in which the tube was placed had a size such that about 1½ inches of the Monel tube extended on either side of the furnace.

$C_3F_8$ was used as the fluorocarbon. This gas and the hydrogen were led from storage cylinders through flowmeters and were mixed just before entering the reaction tube. The reaction products were led through a sodium fluoride tube into a trap cooled by liquid air, the uncondensed residual hydrogen passing through the latter. The condensate was then led over a column-head cooled by solid carbon dioxide which condensed a higher-boiling fraction; the uncondensed lower-boiling fraction was led to a trap cooled by liquid air and there condensed.

In a five hour total run, 172.5 grams of $C_3F_8$ were introduced into the reaction tube, the flow rates being approximately 0.45 mol $H_2$ and 0.19 mol $C_3F_8$ per hour. The temperature varied in the range of 785–855° C. The total crude condensate weighed 134 grams, of which 37.5 grams was the lower-boiling fraction condensed by liquid air.

The liquid air condensate was purified by passage through 15% aqueous potassium hydroxide followed by passage through a phosphorus pentoxide tube to remove moisture. The purified product weighed 34 grams. This was transferred to a glass tube connected to a vacuum system. Two layers were observed at the boiling point. A separation was made by immersing the tube in liquid air so as to immerse the lower layer, and boiling off the upper layer at reduced pressure. The upper layer material was fractionated in a packed low temperature column. A 23 gram fraction was obtained which had a boiling range of −82 to −78° C. and a molecular weight of 70. This was identified as relatively pure $CF_3H$. A small higher boiling fraction (−78 to −57° C.), having a molecular weight of 64.5, appeared to be $CF_3H$ mixed with some $CF_2H_2$.

The previously mentioned higher-boiling fraction, which was condensed by solid carbon dioxide, was purified in the same way and introduced into a tube connected to a vacuum system. Two layers were formed, which seemed to be miscible at the boiling point. An attempted distillation did not result in significant separation. The material boiling below −40° C. weighed 21.5 grams and was combined with the highest boiling portions from the liquid air condensate (above −78° C.), weighing 4.5 grams.

This material was subjected to thermal bromination as a means of analysis. A gaseous mixture of the material with an excess of bromine was passed through a "Pyrex" glass tube heated to 500–600° C. After washing with 15% aqueous potassium hydroxide and drying, the product was fractionally distilled. An 8 gram fraction was obtained having a boiling range of −22 to −20.5° C. and a molecular weight of 197–202. This was identified as $C_2F_5Br$, thus establishing the presence of $C_2F_5H$ in the pre-brominated original condensate from the hydrogenolysis.

Further fractionation of the residue of this fractionation yielded material having a measured molecular weight of 208, which corresponds to $C_2F_4Br_2$ (theoretical molecular weight of 210), thus further demonstrating that one of the products of the original hydrogenolysis was $CF_2H_2$.

In the foregoing procedure, the Monel metal lining for the reaction tube was used to avoid the heavy carbonization that had resulted in earlier experiments where an unlined iron pipe had been used. It has also been found that liners of graphite and of amorphous carbon are effective.

What we claim is as follows:

1. A method of making a fluorocarbon monohydride which comprises passing a gaseous mixture of hydrogen and a polycarbon fluorocarbon, having the formula $C_nF_{2n+2}$, through a heated tube maintained at a temperature of the order of 800–900° C., so as to effect hydrogenolysis and produce a reaction product having the formula $C_nF_{2n+1}H$.

2. A method of making saturated fluorocarbon monohydrides and dihydrides which comprises passing a gaseous mixture of hydrogen, and a saturated aliphatic fluorocarbon having at least three carbon atoms in the molecule, through a heated tube maintained at a temperature of the order of 800–900° C. so as to effect hydrogenolysis.

3. As a new chemical process, the vapor-phase high-temperature thermal hydrogenolysis of starting compounds of the class consisting of saturated polycarbon fluorocarbons and their monohydrides, monochlorides and monobromides, which includes the step of passing a gaseous mixture of hydrogen and the starting compound through a heated tube maintained at a temperature of the order of 800–900° C. so as to cause carbon-carbon bond cleavage and the formation of carbon-hydrogen bonds without causing fluorine atom replacement.

4. As a new chemical process, the vapor-phase high-temperature thermal hydrogenolysis of starting compounds of the class consisting of saturated aliphatic polycarbon fluorocarbons and their monohydrides, monochlorides and monobromides, which includes the step of passing a gaseous mixture of hydrogen and the starting compound through a heated tube maintained at a temperature of the order of 800–900° C. so as to cause carbon-carbon bond cleavage and the formation of carbon-hydrogen bonds without causing fluorine atom replacement, producing therefrom a reaction product primarily consisting of saturated aliphatic fluorocarbon derivatives having fewer carbon atoms than the starting compound.

JOSEPH H. SIMONS.
WILBUR H. PEARLSON.
WILLIAM R. JAMES.

REFERENCES CITED

The following references are of record in the file of this patent:

UNITED STATES PATENTS

| Number | Name | Date |
|---|---|---|
| 2,427,791 | Ipatieff et al. | Sept. 23, 1947 |

OTHER REFERENCES

Grosse et al., Ind. Eng. Chem., vol. 39, 367–374 (1947).

Ruff et al., Zeit. für Anorg. Chemie, vol. 201, 256–257 (1931).